Sept. 6, 1938.                H. A. DOUGLAS                    2,129,303
              MECHANICAL FORCE TRANSMISSION APPARATUS
                    Filed Dec. 10, 1936        2 Sheets—Sheet 1
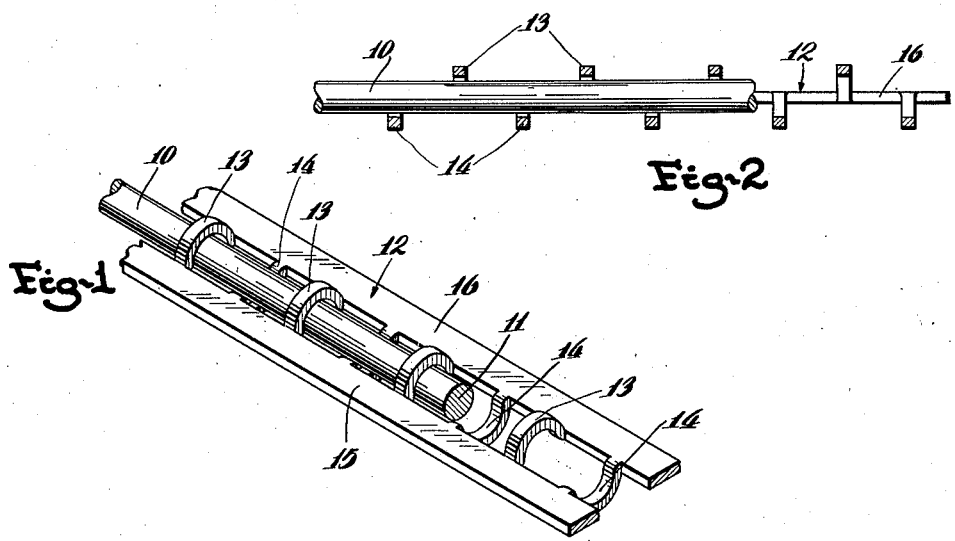
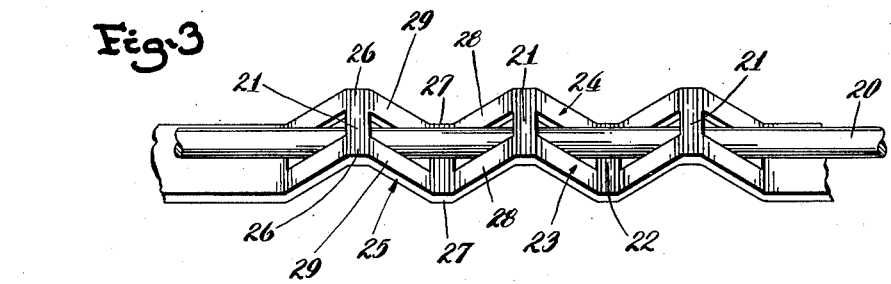
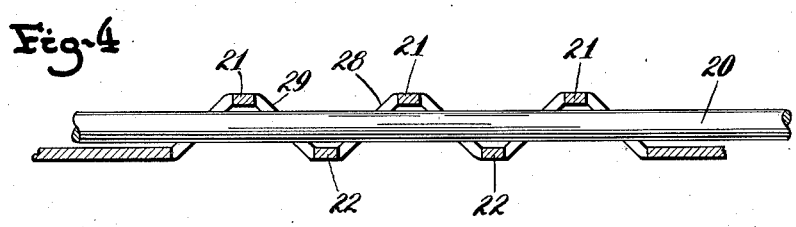
Harry A. Douglas
INVENTOR
By Freeman, Sweet, Albrecht and Weidman
ATTORNEYS Sept. 6, 1938.  H. A. DOUGLAS  2,129,303
MECHANICAL FORCE TRANSMISSION APPARATUS
Filed Dec. 10, 1936  2 Sheets-Sheet 2
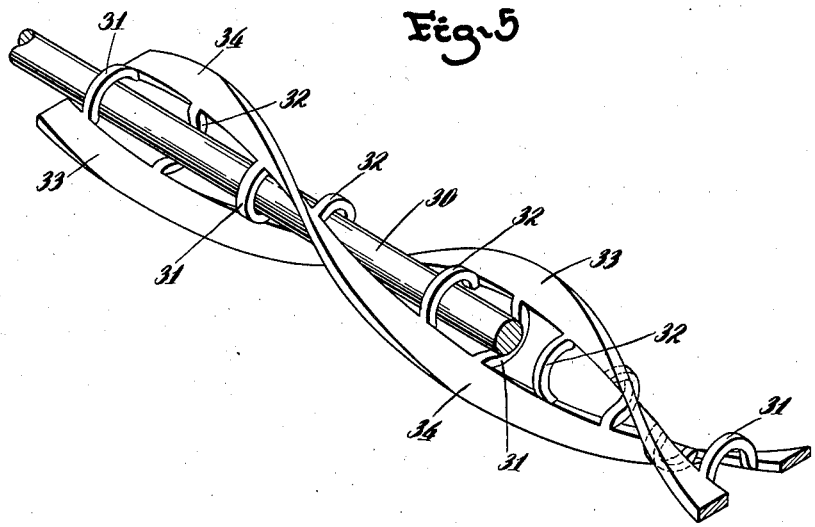
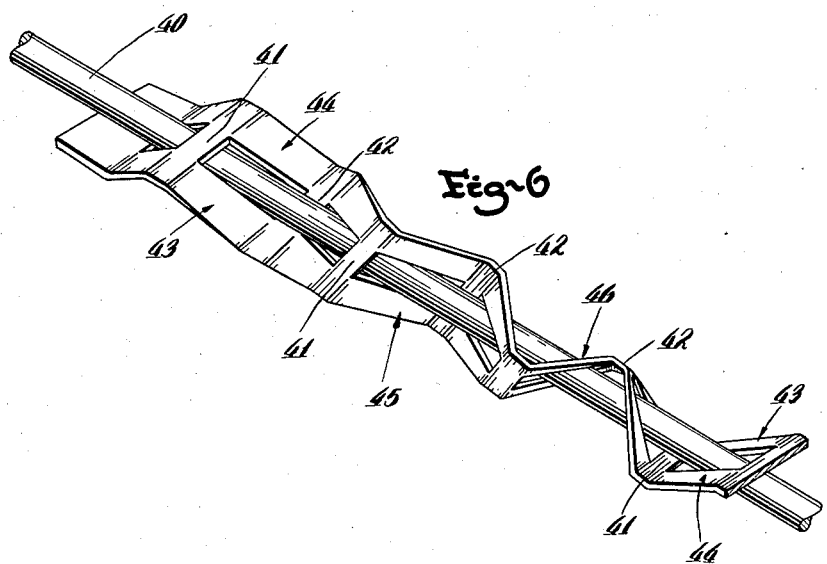
Harry A. Douglas
INVENTOR
By Freeman, Sweet, Albrecht and Weidman
ATTORNEYS Patented Sept. 6, 1938

2,129,303

UNITED STATES PATENT OFFICE 2,129,303

MECHANICAL FORCE TRANSMISSION APPARATUS

Harry A. Douglas, Bronson, Mich.

Application December 10, 1936, Serial No. 115,241

20 Claims. (Cl. 74—501)

My invention relates to apparatus for mechanically transmitting force, and more particularly to force transmission means in which the elements are flexible to enable transmission of force longitudinally along a curved line, and the principal object of my invention is to provide a new and improved force transmission apparatus of this type.

This application comprises a continuation in part of my co-pending application, Serial Number 19,121, filed April 30, 1935.

In the drawings accompanying this specification and forming a part of this application, I have shown, for purposes of illustration, one form which my invention may assume. In these drawings:

Figure 1 is a broken perspective view of one embodiment of my invention,

Figure 2 is a broken, longitudinal sectional view of said embodiment, showing parts thereof in elevation, Figure 3 is a broken, perspective view of another embodiment of the invention, Figure 4 is a longitudinal sectional view similar to Figure 2, and further showing the embodiment illustrated in Figure 3, Figure 5 is a broken perspective view of an additional embodiment of the invention, while Figure 6 is a view similar to Figure 5 of still another embodiment of the invention.

Referring first to Figures 1 and 2 of the drawings, the embodiment of the invention illustrated, comprises elongated flexible transmitting means 10, preferably in the form of a resilient metallic rod or wire of round cross-section, as indicated at 11, intended for transmitting force from one end to the other, and of such character as to require the use of guide means intermediate its ends to prevent buckling or lateral escape of the same during operation.

Guide means, indicated generally at 12, are provided, and comprise a plurality of sections 13 and 14, which extend transversely of the transmitting means 10, and are longitudinally spaced apart, the sections 13 being in the form of half-round loops which at intervals overlie one side surface of the transmitting means 10, while similar loops 14 extend in an opposite direction, in staggered relation with respect to the loops 13, and overlie the opposite side surface of said transmitting means 10. One set of ends of both groups of loops 13 and 14 are preferably formed integrally with a longitudinally extending support 15, while the opposite set of ends of both groups of loops 13 and 14, are preferably formed integrally with a second longitudinally extending support 16, the inner edges of the supports 15 and 16 being spaced apart a predetermined distance slightly greater than the diameter of the transmitting means 10, to cooperate with the loops 13 and 14 in restraining lateral movement of said transmitting means.

The longitudinally extending supports 15 and 16 preferably are in the form of flat sections of sheet metal, disposed longitudinally edgewise with respect to the transmitting means 10, and while having sufficiently greater stiffness than the transmitting means 10 to accomplish the purpose intended, may readily be bent flatwise to any curvature desired. The edgewise disposition of the supports 15 and 16, however, provides additional stiffness to bending of the guide means in a flatwise direction, thereby providing guide means which flex more readily in certain planes than in others. The length of the guide means to a considerable extent controls the amount of flexing thereof in a flatwise plane, though regardless of such length, this flexing may take place through a weaving action inherently present because of the manner in which the loops 13 and 14 are disposed with reference to the supports 15 and 16. Although the guide means 12 may be otherwise constructed, it is preferred to form the entire guide means from a single piece of sheet metal, varying the quality and stiffness of the material to suit requirements.

When the guide means 12 is confined at their ends, the transmitting means 10 is freely slidable therethrough, regardless of the curvature given to the guide means 12, and is restrained against lateral escape by the overlying loops 13 and 14, and by the cooperating portions of the supports 15 and 16, as will be appreciated.

Referring now to Figures 3 and 4, a somewhat different embodiment comprises transmitting means 20, similar to the transmitting means 10, and guide means having transverse sections 21 and 22, the sections 21 overlying the longitudinal side surfaces of one side of the transmitting means 20, while the sections 22 overlie the opposite side surfaces thereof. At one set of ends, the sections 21 and 22 are connected to supporting means 23 extending longitudinally along one side of the transmitting means 20, while the opposite ends thereof are connected to similar supporting means 24, extending longitudinally along the opposite side of said transmitting means, the supporting means 23 and 24 being flat and disposed edgewise to said transmitting means, and having transversely extending undulations 25, the crest portions 26 and 27 of which lie at opposite sides of the transmitting means 20, and merge with the transverse sections 21 and 22 respectively, and between the crests 26 and 27, the undulations include oppositely inclined portions 28 and 29 extending at angles which intersect the long axis of the transmitting means 20, the transverse sections 21 and 22, and the supporting means 23 and 24, preferably being formed from a continuous strip of sheet metal.

In this construction the guide means may be bent to any desired curved shape, in a flatwise direction, and also, to a less extent, in an edgewise direction, in the latter case the undulations 25 permitting a weaving action which facilitates edgewise flexing. The transmitting means 20 is freely slidable longitudinally at all times and is restrained from lateral escape by the oppositely disposed spaced overlying transverse sections 21 and 22, and by the inner edges of the inclined portions 28 and 29 of the supporting means 23 and 24.

In Figure 5, the embodiment there shown, comprises transmitting means 30, oppositely disposed spaced transverse sections or loops 31 and 32, and spaced longitudinally extending supports 33 and 34, to which the transverse sections 31 and 32 are connected, these parts corresponding to the parts 10, 13, 14, 15, and 16, already described in connection with Figures 1 and 2, the supporting means 33 and 34 in this case being in twisted formation, wherein the supporting means 33 and 34 lie edgewise to the transmitting means 30, and extend in relatively wide helical formation longitudinally along the transmitting means 30, with the long axis thereof as a center.

In this construction the edgewise helical disposition of the supporting means 33 and 34, stiffens the structure, and provides substantially uniform resistance to longitudinal flexing in all directions, yet the structure is sufficiently flexible for the purpose intended.

The embodiment shown in Figure 6 comprises transmitting means 40, transverse sections 41 and 42, longitudinally extending supporting means 43 and 44, and undulations 45, corresponding substantially to the parts 20, 21, 22, 23, 24, and 25, heretofore described in connection with Figures 3 and 4, this formation being longitudinally twisted to present the supporting means 43 and 44 in relatively wide helical formations 46 longitudinally about said transmitting means 40, with the long axis thereof as a center.

In this construction, curvature of the guide means may readily be effected, probably accompanied by a slight weaving effect, yet the transmitting means 40 is freely slidable at all times, and is held against lateral escape during operation.

From the foregoing it will be apparent to those skilled in the art that the illustrated embodiments of my invention provide a new and improved force transmission apparatus, readily and conveniently constructed and assembled, and accordingly, accomplish at least the principal object of my invention. On the other hand, it also will be obvious to those skilled in the art that the illustrated embodiments of my invention may be variously changed and modified, without departing from the spirit of my invention, or sacrificing the advantages thereof, and that accordingly, the disclosure herein is illustrative only, and my invention is not limited thereto.

I claim:

1. A force transmitting mechanism, comprising: elongated transmitting means; longitudinally spaced sections extending transversely of said transmitting means and overlying different sides of the same, and longitudinally extending means having portions connecting said spaced sections and to which said sections are rigidly connected, said longitudinally extending means cooperating with said transverse sections to retain said transmitting means against lateral escape, each connecting portion of said longitudinally extending means being confined to a side surface of said transmitting means.

2. A force transmitting mechanism, comprising: elongated flexible transmitting means; sections disposed transversely of said transmitting means and overlying different sides of the same, said sections being spaced longitudinally of said transmitting means and each overlying only a portion of the external transverse periphery of said transmitting means at intervals therealong, and longitudinally extending means to which said sections are connected, said longitudinally extending means cooperating with said transverse sections to retain said transmitting means against lateral escape.

3. A force transmitting mechanism, comprising: elongated flexible transmitting means; sections disposed transversely of said transmitting means and each overlying only a restricted area of different sides thereof short of encircling the same, said sections being spaced longitudinally of said transmitting means, the overlying means of one section extending laterally about said transmitting means in one direction, and the overlying means of another section extending laterally about said transmitting means in an opposite direction; and longitudinally extending means to which said sections are connected, said longitudinally extending means cooperating with said transverse sections to retain said transmitting means against lateral escape.

4. A force transmitting mechanism, comprising: elongated flexible transmitting means; and supporting means for said transmitting means, including continuous first means disposed longitudinally alongside of said transmitting means, and second means carried by said first means, extending transversely of said first means and of said transmitting means, and at longitudinally spaced intervals overlying and contacting opposed sides of said transmitting means to retain the same against lateral escape, each of said second means laterally encompassing only a part of said transmitting means short of encircling the same.

5. A force transmitting mechanism, comprising: elongated flexible transmitting means; and supporting means for said transmitting means, including first means having a continuous piece extending longitudinally along one side of said transmitting means and a spaced continuous piece extending along the opposite side of said transmitting means, and second means carried by said supporting means, connected to and extending transversely between said opposite continuous pieces, and at longitudinally spaced intervals overlying said transmitting means to retain the same against lateral escape.

6. A force transmitting mechanism, comprising: elongated flexible transmitting means; elongated guide means having spaced sections disposed transversely of said transmitting means and overlying different sides of the same, and longitudinally extending means to which said sections are connected, cooperating with said transverse sections to retain said transmitting means against lateral escape; said elongated guide means being longitudinally twisted about the long axis of said transmitting means.

7. A force transmitting mechanism, comprising: elongated flexible transmitting means; elongated guide means having spaced sections disposed transversely of said transmitting means and overlying different sides of the same, and longitudinally extending means, to which said sections are connected, cooperating with said transverse sections to retain said transmitting means against lateral escape, said guide means being formed with transverse undulations longitudinally therealong, the crests of which merge with said spaced sections, while the portions of said undulations between the crests thereof laterally intersect the plane in which said transmitting means lies.

8. A force transmitting mechanism, comprising: elongated flexible transmitting means; and supporting means for said transmitting means, including first means extending longitudinally along said transmitting means, of greater longitudinal stiffness than said transmitting means, yet somewhat flexible, said continuous first means being so constructed and arranged as to be more flexible laterally in one direction than in another, and second means carried by said first means, extending transversely of said first means and of said transmitting means, and at longitudinally spaced intervals overlying and contacting opposed sides of said transmitting means to retain the same against lateral escape.

9. A force transmitting mechanism, comprising: elongated flexible transmitting means; elongated guide means having spaced sections disposed transversely of said transmitting means and overlying different sides of the same, said sections being spaced longitudinally of said transmitting means and overlying the same only at intervals therealong, and longitudinally extending means to which said sections are connected, cooperating with said transverse sections to retain said transmitting means against lateral escape; said elongated guide means being longitudinally twisted about the long axis of said transmitting means.

10. A force transmitting mechanism, comprising: elongated flexible transmitting means; elongated guide means having spaced sections disposed transversely of said transmitting means and overlying opposite sides of the same, said sections being spaced longitudinally of said transmitting means and overlying the same only at intervals therealong, and longitudinally extending means, to which said sections are connected, cooperating with said transverse sections to retain said transmitting means against lateral escape; said guide means being formed with transverse undulations longitudinally therealong and intersecting the plane in which said transmitting means lie, the crest portions of said undulations forming the spaced sections of said guide means.

11. A force transmitting mechanism, comprising: elongated flexible transmitting means; elongated guide means having spaced sections disposed transversely of said transmitting means and overlying opposite sides of the same, said sections being spaced longitudinally of said transmitting means and overlying the same only at intervals therealong, and longitudinally extending means, to which said sections are connected, cooperating with said transverse sections to retain said transmitting means against lateral escape; said guide means being formed with transverse undulations longitudinally therealong and intersecting the plane in which said transmitting means lie, the crest portions of said undulations forming the spaced sections of said guide means, and said guide means being longitudinally twisted about the long axis of said transmitting means.

12. A force transmitting mechanism, comprising: elongated flexible transmitting means; and elongated supporting means for said transmitting means, including continuous first means extending longitudinally alongside of said transmitting means, and second means carried by said first means, extending transversely of said first means and of said transmitting means, and at longitudinally spaced intervals overlying said transmitting means to retain the same against lateral escape, said supporting means being longitudinally twisted about the long axis of said transmitting means.

13. A force transmitting mechanism, comprising: elongated flexible transmitting means; and elongated supporting means for said transmitting means, including first means having a first continuous piece extending longitudinally along a longitudinal surface of said transmitting means and a spaced second continuous piece extending along a different longitudinal surface of said transmitting means, and second means carried by said supporting means, connected to, and extending transversely between, said continuous pieces, at longitudinally spaced intervals, and overlying said transmitting means to retain the same against lateral escape; said supporting means being longitudinally twisted about the long axis of said transmitting means.

14. A force transmitting mechanism, comprising: elongated flexible transmitting means; elongated guide means having spaced sections disposed transversely of said transmitting means and overlying different sides of the same, and longitudinally extending means, to which said sections are connected, cooperating with said transverse sections to retain said transmitting means against lateral escape; said elongated guide means being longitudinally twisted about the long axis of said transmitting means, and formed with transversely disposed undulations.

15. As an article of manufacture, guide means adapted to accommodate flexible transmitting means, comprising elongated guide means having spaced sections disposed transversely thereof and having longitudinally aligned means through which said transmitting means is adapted to extend, said guide means including also longitudinally extending means to which said spaced sections are connected, adapted to cooperate with said transverse sections in retaining said transmitting means against lateral escape, each of said spaced sections being restricted transversely and longitudinally and transversely overlying a portion of said transmitting means short of encircling the same.

16. A force transmitting mechanism, comprising: elongated flexible transmitting means circular in cross section; and guide means for carrying said transmitting means, including a longitudinally extending flat section disposed edgewise to lateral flexing of said transmitting means in one direction to stiffen said guide means, and means cooperating with said flat section and overlying and contacting opposed sides of said transmitting means.

17. Guide means for a flexible transmitting element, comprising: an elongated flat strip of metal bent between its ends to form a series of spaced transversely extending wall sections pierced centrally in longitudinal alignment to accommodate said transmitting element.

18. Apparatus for mechanically transmitting force, comprising: an elongated flexible member; guiding means, including an elongated strip of sheet material having a plurality of undulations, the crests and troughs of which alternate longitudinally of said strip, so constructed and arranged that said elongated flexible member is guided by said guiding means for movement longitudinally with respect to said guiding means.

19. Apparatus for mechanically transmitting force, comprising: an elongated strip of sheet material having a plurality of undulations, the crests and troughs of which alternate longitudinally of said strip, said strip being provided with apertures extending through said strip between the crests and troughs of said undulations; and an elongated flexible member, threaded through said apertures, so constructed and arranged with respect to said apertures that said flexible member is movable longitudinally with respect to said strip.

20. A force transmitting mechanism, comprising: flexible elongated transmitting means; and guide means, including a series of spaced longitudinally and laterally extending sections defining means through which said transmitting means extends, said sections being constructed and arranged to contact opposed sides of said transmitting means and to engage limited spaced areas thereof, each less than the transverse surrounding periphery thereof, and extending longitudinally along said guide means so as to retain said transmitting means against lateral escape.

HARRY A. DOUGLAS.